United States Patent
Wu et al.

(10) Patent No.: US 12,056,957 B1
(45) Date of Patent: Aug. 6, 2024

(54) PERSONALIZED FACE BIOMETRIC KEY GENERATION METHOD BASED ON DEEP NEURAL NETWORK CODING

(71) Applicant: HANGZHOU DIANZI UNIVERSITY, Hangzhou (CN)

(72) Inventors: Zhendong Wu, Hangzhou (CN); Yanhua Huang, Hangzhou (CN)

(73) Assignee: HANGZHOU DIANZI UNIVERSITY, Hangzhou (CN)

( * ) Notice: Subject to any disclaimer, the term of this patent is extended or adjusted under 35 U.S.C. 154(b) by 0 days.

(21) Appl. No.: 18/585,111

(22) Filed: Feb. 23, 2024

Related U.S. Application Data (63) Continuation of application No. PCT/CN2023/105657, filed on Jul. 4, 2023.

(30) Foreign Application Priority Data

May 26, 2023 (CN) .......................... 202310606687.2

(51) Int. Cl.
| | | |
|---|---|---|
| G06V 40/50 | (2022.01) | |
| G06V 10/26 | (2022.01) | |
| G06V 10/77 | (2022.01) | |
| G06V 10/774 | (2022.01) | |
| G06V 10/776 | (2022.01) | |
| G06V 10/82 | (2022.01) | |

(Continued)

(52) U.S. Cl.
CPC .............. *G06V 40/53* (2022.01); *G06V 10/26* (2022.01); *G06V 10/7715* (2022.01);
(Continued)

(58) Field of Classification Search
CPC .... G06V 40/53; G06V 10/26; G06V 10/7715; G06V 10/774; G06V 10/776;
(Continued)

(56) References Cited

U.S. PATENT DOCUMENTS

| | | | | |
|---|---|---|---|---|
| 2018/0123797 | A1* | 5/2018 | Noh | ..................... G06V 40/172 |
| 2023/0095182 | A1 | 3/2023 | Yao et al. | |
| 2023/0289469 | A1* | 9/2023 | Uzun | ..................... G06F 21/32 |

FOREIGN PATENT DOCUMENTS

| | | |
|---|---|---|
| CN | 101452526 A | 6/2009 |
| CN | 102111418 A | 6/2011 |

(Continued)

OTHER PUBLICATIONS

Vulfin et al. "Neural network biometric cryptography system." Proceedings of the Information Technologies and Intelligent Decision Making Systems (ITIDMS2021). Ceur 2843 (2021). (Year: 2021).*

(Continued)

*Primary Examiner* — Phuoc Tran (57) ABSTRACT

The invention relates to a personalized face biometric key generation method based on deep neural network coding, comprising: preprocessing a face image; converting the preprocessed face image into a feature map with a stability greater than or equal to 80% through a personalized feature extractor Feature_Extraction; outputting a face biometric key with a stability greater than or equal to 99% through a stabilizer Stabilizer; and carrying out error correction with an error correction code on the output biometric key through an error correction coding module and then obtaining a face biometric key with a stability greater than 99.5% through fuzzy extraction by a combined method of error correction code and fuzzy extraction. The finally generated face biometric key has high bit strength and recognition accuracy, can be directly applied to a symmetric cryptographic system and a public key cryptographic system as a key, and satisfies revocability and non-linkability.

6 Claims, 7 Drawing Sheets

(51) Int. Cl.
*G06V 40/16* (2022.01)
*H04L 9/08* (2006.01)

(52) U.S. Cl.
CPC .......... *G06V 10/774* (2022.01); *G06V 10/776* (2022.01); *G06V 10/82* (2022.01); *G06V 40/162* (2022.01); *G06V 40/169* (2022.01); *G06V 40/171* (2022.01); *H04L 9/0866* (2013.01)

(58) Field of Classification Search
CPC .... G06V 10/82; G06V 40/162; G06V 40/169; G06V 40/171; H04L 9/0866
See application file for complete search history.

(56) References Cited

FOREIGN PATENT DOCUMENTS

| | | | |
|---|---|---|---|
| CN | 103886235 | A | 6/2014 |
| CN | 110543822 | A | 12/2019 |
| CN | 112906527 | A | 6/2021 |
| CN | 113128364 | A | 7/2021 |
| KR | 100749380 | B1 | 8/2007 |

OTHER PUBLICATIONS

Rathgeb et al. "Deep Face Fuzzy Vault: Implementation and Performance." Computers & Security 113 (2022): 102539. (Year: 2022).*

Kuznetsov et al. "Deep learning based fuzzy extractor for generating strong keys from biometric face images." 2022 IEEE 9th International Conference on Problems of Infocommunications, Science and Technology (PIC S&T). IEEE, 2022. (Year: 2022).*

Internation Search Report of PCT/CN2023/105657, Mailed Dec. 21, 2023.

* cited by examiner

PERSONALIZED FACE BIOMETRIC KEY GENERATION METHOD BASED ON DEEP NEURAL NETWORK CODING

CROSS-REFERENCE TO RELATED APPLICATIONS

This application is a continuation of International Patent Application No. PCT/CN2023/105657 with a filing date of Jul. 4, 2023, designating the United States, now pending, and further claims priority to Chinese Patent Application No. 202310606687.2 with a filing date of May 26, 2023. The content of the aforementioned applications, including any intervening amendments thereto, are incorporated herein by reference.

TECHNICAL FIELD

The present invention belongs to the technical field of biometric key generation, and relates to a personalized face biometric key generation method based on deep neural network coding.

BACKGROUND OF THE PRESENT INVENTION

In today's era of big data, with the rapid development of biometric identification technology, biometric authentication (such as fingerprints, irises and faces) has been gradually integrated into people's lives. However, with the improvement of biometric authentication accuracy, people began to pay attention to biometric privacy. More and more biometric features are directly collected and stored in a database. These biometric features are directly related to personal property safety. Once these unprotected biometric feature databases are attacked and leaked, there may be great privacy risks. Therefore, a biometric feature protection template is very important. The biometric feature protection template generally needs to have three basic properties: unlinkability, irreversibility and revocability. The purpose of unlinkability is to be unable to match different databases with the same feature template. The purpose of irreversibility is to be unable to restore original biometric features by the biometric feature protection template. The purpose of revocability is to be able to replace the biometric feature protection template frequently to prevent leakage.

A symmetric cryptosystem or a public key cryptosystem is used for encryption and decryption in traditional biometric feature protection templates. However, the existence of the key increases a burden on a key owner, and once the key is leaked, the biometric features may be directly exposed. Therefore, in recent years, the method of biometric key has been widely studied by researchers, and the method of directly generating the biometric key through the biometric features not only ensures the safety of the biometric features, but also reduces the difficulty of key memory. At present, there are a few of researches on a face-based biometric key, methods of fuzzy commitment and fuzzy vault are used in traditional face biometric keys, and limited errors are allowed to match through fuzzy extraction. However, the two methods are not ideal in recognition accuracy and false recognition rate. With the development of deep neural network, researchers choose to use the deep neural network for end-to-end direct learning of the mapping of a face feature to a random binary code. However, the method of end-to-end direct learning of the random binary code is deficient in explanation, thus being difficult to be directly applied to a system of thousands of faces. In addition, the method of end-to-end generation of the face biometric key is deficient in strength, which is generally less than 512 bits, and the accuracy is generally reduced with the improvement of the key strength.

Existing biometric key generation technologies mainly comprise the followings. (1) Chinese Patent No. 201410075104.9 discloses a frontal face image biometric key generation method, which comprises the following steps of: subjecting a frontal face image to a feature space conversion, projecting the frontal face image into a high-dimensional space, stabilizing face feature information into an acceptable fluctuation range in the high-dimensional space, extracting a digital sequence from a stabilized feature vector, and encoding in the digital sequence to generate a biometric key. A traditional feature extraction method PCA is used to extract the face feature vector, which may lead to a short length (generally 256 bits) of the stable biometric key on one hand, and may not achieve an ideal result in accuracy on the other hand. (2) Chinese Patent No. 202110350155.8 discloses a fingerprint biometric key generation method based on deep neural network coding, which comprises the following steps of: extracting stable feature components of different samples of the same fingerprint more accurately by combining a classical fingerprint image processing method with a deep neural network method, and further stabilizing fingerprint features at feature values through processing by the deep neural network. However, there are not many stable features in the fingerprint, and a bit sequence of a final biometric key is short (generally about 512 bits). With the increase of a bit length of the biometric key, the recognition accuracy can be reduced obviously, and the false recognition rate is high.

SUMMARY OF THE PRESENT INVENTION

Aiming at the problems of low strength, low recognition accuracy and high false recognition rate commonly existing in an existing face biometric key method, the present invention provides a personalized face biometric key generation method based on deep neural network coding.

In order to achieve the object of the present invention, the following technical solutions are used in the present invention.

The method comprises the following steps of: preprocessing a face image; converting the preprocessed face image into a feature map with a stability greater than or equal to 80% through a personalized feature extractor Feature_Extraction; outputting a face biometric key with a stability greater than or equal to 99.5% through a stabilizer Stabilizer; and carrying out error correction with an error correction code on the output biometric key through an error correction coding module and then obtaining a face biometric key with a stability greater than 99.5% through fuzzy extraction by a combined method of error correction code and fuzzy extraction.

The personalized feature extractor comprises a deep neural network module Fmap_E based on personalized training, a feature point screening module and a binary quantization fault-tolerance module. The stabilizer is a feature stabilization convolution network with an encoder-decoder structure. The preprocessed face feature map is subjected to personalized feature point extraction, screening and binary quantization fault-tolerance in sequence, a feature point is stable, and a stable face biometric key is obtained after the fuzzy extraction of the biometric key.

A face is positioned from a more complex image through preprocessing, and other information such as environment is removed as much as possible. A face feature is subjected to personalized learning through the deep neural network module Fmap_E based on personalized training, and a feature map containing the feature point is provided. A common feature in all face feature maps is removed by feature point screening, and an exclusive feature of a specific face in the feature map is selected. The feature point in the feature map is selected and quantized on the basis of feature point screening through binary quantization fault-tolerance, the exclusive feature of the face is selected through feature point screening, and these features are magnified through binary quantization, which is beneficial for stabilization by the stabilizer. The screened feature map is converted into a more stable face biometric key by the stabilizer Stabilizer. After the stabilized key is subjected to error correction relative to a target biometric key through the error correction with the error correction code, a final biometric key is extracted by fuzzy extraction.

The present invention specifically comprises the following steps of:

step 1: preprocessing of image:

taking a public face data set as a pretraining data set, and preprocessing an image in the face data set; and segmenting a face region from the image, and scaling the segmented face region image to the same size to obtain a face feature map;

step 2: pretraining:

pretraining the image preprocessed in the step 1 by a deep neural network, wherein the pretrained network is capable of accurately recognizing a face in the pretraining data set;

step 3: extraction of personalized feature: converting the face image into a face biometric key with a stability greater than or equal to 80% to improve a learning effect of the image on a stabilizer;

step 3.1: construction of deep neural network module Fmap_E based on personalized training:

preprocessing a personalized face image set to be trained in the step 1 and then inputting the preprocessed face image set into the pretrained deep neural network in the step 2 for transfer learning; and intercepting a part of the deep neural network after transfer learning to form the deep neural network module Fmap_E based on personalized training for extracting the personalized face feature map;

step 3.2: screening of feature map:

removing a common feature in feature maps according to all face feature maps, and selecting an exclusive feature in feature maps according to single-type face feature maps, wherein a stability of the feature map subjected to feature point screening is greater than or equal to 60%; and step 3.3: binary quantization:

obtaining a single-type face average feature map through a single-type face feature map set, binarizing the single-type face average feature map to obtain a binarization matrix, and processing the single-type face feature map set according to the binarization matrix; and regarding the binarized single-type face average feature map as the face biometric key, wherein a stability of the quantized face biometric key is greater than or equal to 80%;

step 4: learning by stabilizer:

taking a feature stabilization convolution network with an encoder-decoder structure as the stabilizer, inputting the face biometric key with the stability greater than or equal to 80% output in the step 3 into the stabilizer for stable learning, and outputting a face biometric key with a stability greater than or equal to 99.5%; and step 5: fuzzy extraction:

carrying out error correction with an error correction code on the biometric key output in the step 4 through an error correction coding module and then obtaining a face biometric key with a stability greater than 99.5% through fuzzy extraction by a combined method of error correction coding and fuzzy extraction.

Further, a residual network Resnet in the convolutional neural network is selected as the deep neural network in the step 2.

Further, the step 3.2 comprises global screening and local screening:

in the global screening, all feature maps Faces_featuremap are used, and a global feature map all_Fm is obtained by cumulative average of each pixel:

$$\text{all\_Fm} = \frac{\sum_j \sum_i \text{Faces\_featuremap}_i}{\text{len}(\text{Faces\_featuremap})};$$

wherein, all_Fm is the global feature map, and len( ) is a number of images in the data set;

in the local screening, a local feature map i_Fm is obtained by cumulative average of an i-type face feature map set Face_featuremap$_i$:

$$\text{i\_Fm} = \frac{\sum_j \text{Faces\_featuremap}_i}{\text{len}(\text{Faces\_featuremap}_i)};$$

wherein, i_Fm is the i-type face local feature map, and len( ) is a number of images in the data set;

selection of each feature map Face_featuremap$_i^j$ in the i-type face feature map set Face_featuremap$_i$ simultaneously satisfies |Face_featuremap$_i^j$−all_Fm|>θ$_i$, a feature point of −θ$_2$≤Face_featuremap$_i^j$−i_Fm≤θ$_2$ is taken as a preliminary screening point of the feature map, a feature point satisfying the selection requirement is a point m$_i$(a, b)=1 with corresponding abscissa position a and ordinate position b in a feature point selection matrix m$_i$, and a feature point not satisfying the selection requirement is a point m$_i$(a, b)=0; wherein θ$_i$ and θ$_2$ are set thresholds;

a screened feature map set F_m$_i$ and the feature point selection matrix m$_i$ are obtained after feature point selection; m$_i$ is a binary matrix with the same size as the Face_featuremap$_i$; and choose( ) is a selection process of the feature point in the Face_featuremap$_i$, feature point traversal is carried out on each image Face_featuremap$_i^j$ in Face_featuremap$_i$=[Face_featuremap$_i^1$, Face_featuremap$_i^2$,L Face_featuremap$_i^n$], when m$_i$(a, b)=1, a feature point F_m$_i^j$(a,b) is reserved, and when m; (a, b)=0, a feature point Face_featuremap$_i^j$ (a,b) is discarded;

$$m_i = \begin{pmatrix} 0 & 1 & K & 1 & 0 \\ 0 & 0 & L & 1 & 1 \\ M & M & O & M & M \\ 1 & 0 & L & 0 & 1 \\ 1 & 1 & L & 1 & 0 \end{pmatrix};$$

and

F_m$_i$=choose(Face_featuremap$_i$,m$_i$), wherein choose( ) is a feature point selection operation, F_m$_i$ is an i-type face feature point screening result, Face_featuremap$_i$ is the i-type face feature map set, and m$_i$ is the i-type face feature point selection matrix.

Further, the step 3.3 specifically comprises:

carrying out weighted average on the feature map set F_m$_i$=[F_m$_i^1$,F_m$_i^2$,L F_m$_i^n$] to obtain an average feature map $$avg_i = \frac{\sum_j F\_m_i^j}{len(F\_m_i)}$$

first before binary quantization; wherein avg$_i$ is the average feature map of the data set F_m$_i$ of i-type face subjected to feature point screening, and len(F_m$_i$) is a number of face images in the F_m$_i$, and carrying out a combined operation of global binarization and local binarization on the avg$_i$ to obtain a preliminary face biometric key B_K$_i$;

obtaining a global threshold T_all$_i$ by a global binarization OTSU method firstly, dividing the avg$_i$ into blocks according to a block size of s×s secondly, calculating an average value and a standard deviation of each block, and when the average value is less than a threshold θ$_3$ and the standard deviation is less than a threshold θ$_4$, locally binarizing the block; wherein a Gaussian filter is used to process the block in local binarization, a result of the Gaussian filter is a threshold matrix of the block, which is T$_{s \times s}$=Gauss filter(avg$_{is \times s}$), wherein Gauss filter is the Gaussian filter; and when the average value is greater than or equal to the threshold θ$_3$ and the standard deviation is greater than or equal to the threshold θ$_4$, binarizing the block with the global threshold T_all$_i$, wherein the threshold matrix is T$_{s \times s}$=T_all$_i$ at this time; and traversing the avg$_i$ to obtain a binary threshold matrix T$_i$, and binarizing the feature map in the F_m$_i$ by using the T$_i$; and obtaining a to-be-stabilized biometric key b_k$_i$ after binarizing the F_m$_i$ after binary quantization; and calculating avg$_i$>T$_i$ according to the feature binary threshold matrix T$_i$, wherein when avg$_i$ (a, b)>T$_i$(a, b), B_K$_i$=225, and when avg$_i$(a, b)≤T$_i$(a, b), B_K$_i$=0; wherein a and b are an abscissa and an ordinate respectively;

$B\_K_i$=GLBinarization(avg$_i$,T$_i$);

$b\_k_i$=GLBinarization(F_m$_i$,T$_i$);

wherein GLBinarization( ) is a binary quantization operation, and T$_i$ is the i-type face binary threshold matrix.

Further, the stabilizer in the step 4 is a deep neural network Unet with an encoder-decoder structure, a learning matrix W is added on a top layer of the UNet, and the W improves an effect of the stabilizer by learning a relationship between points; and a combination of Binary CrossEntropy and Sigmoid is taken as a loss function Loss=BCE(Sigmoid ( ), B_K$_i$), the to-be-stabilized biometric key b_k$_i$ is taken as an input of the stabilizer, and the preliminary face biometric key B_K$_i$ is taken as a target for learning.

Further, the step 5 specifically comprises:

carrying out Reed-solomon error correction, wherein a Reed-solomon encoding process is as follows:

the B_K$_i$ is divided into 8 blocks by 512 bits, each block is subjected to an exclusive-or operation of a random binary sequence Random binary sequence$^n$ of 512 bits first, and then each block is corrected by 64 bits for Reed-solomon encoding to obtain 8 blocks of N$_i^n$; and a Reed-solomon decoding process is as follows:

block matching is also carried out in a matching process, B_K'$_i$ generated after the b_k$_i$ passes through the stabilizer Stabilizer is also divided into 8 blocks, which are subjected to an exclusive-or operation with the 8 blocks of N$_i^n$ generated in encoding for Reed-solomon decoding, and Random binary sequence$^m$ is obtained after decoding;

N$_i^n$=Reed-solomon-recode(B_K$_i^n$⊕Random binary sequence$^n$)), wherein B_K$_i^n$ is a target biometric key, Random binary sequence$^m$ is a random binary code, and Reed-solomon-recode( ) is a Reed-solomon error correction coding operation;

Random binary sequence$^m$=Reed-solomon-decode (B_K$_i^{n\prime\prime}$⊕N$_i^n$));

matching Random binary sequence$^m$ with the original Random binary sequence$^n$ and then carrying out fuzzy extraction Fuzzy_extraction( ), and extracting the target biometric key B_K$_i$ when a fuzzy extraction condition is met; wherein a number of completely matched blocks Δ is a fuzzy extraction requirement, and when the number of matched blocks is Δ≥n5, the fuzzy extraction requirement is considered to be met and the B_K$_i$ is extracted:

$B\_K_i$=Fuzzy_extraction(Random binary sequence$^m$, Random binary sequence$^n$).

wherein Random binary sequence$^n$ is the original random binary sequence, Random binary sequence$^m$ is the binary sequence after Reed-solomon decoding, and Fuzzy_extraction( ) is the fuzzy extraction operation.

The feature map containing more personal face features is provided by the deep neural network based on personalized training, but the feature points in the feature map are scattered and unstable, so that it is difficult to use the feature map directly. Therefore, the feature map fault-tolerance method is provided, and the feature selection and quantification technology is used to extract the face feature map with the personal exclusive feature point. Then, the convolution network with the encoder-decoder structure is designed to stabilize the feature map, and the network with the encoder-decoder structure may learn shallow and deep features of the feature map through convolutions with different step sizes, thus realize the stabilization from the feature map to the biometric key. Finally, the key stabilized by the encoder-decoder is subjected to fuzzy extraction by the fuzzy extraction method to generate the face biometric key with a high strength, a high recognition accuracy and a low false recognition rate.

Compared with an existing face biometric key generation method, the present invention has the following advantages.

1. A large number of feature points are provided in a process of personalized feature extraction, and finally, the face biometric key with a bit strength greater than or equal to 4,096 bits is generated.

2. The combined method of the feature extractor and the stabilizer has a higher accuracy compared with an end-to-end face biometric key generation method in which fuzzy extraction is directly carried out on a result feature vector of the deep neural network. An accuracy of the end-to-end method is less than 85%, while an accuracy of the combined method of the feature extractor and the stabilizer is greater than 99.5%.

3. The deep neural network and the matrix operation in the process of face biometric key generation are both an irreversible operation, so that the face biometric key satisfies irreversibility. The face biometric key can be directly applied to a symmetric cryptographic system (such as AES) and a public key cryptographic system (such as RSA) as a key, and satisfies revocability and non-linkability.

DETAILED DESCRIPTION OF PREFERRED EMBODIMENTS

In order to better understand the present invention, some detailed embodiments and specific operation procedures will be made for the present invention with reference to the drawings.

Figure 1:
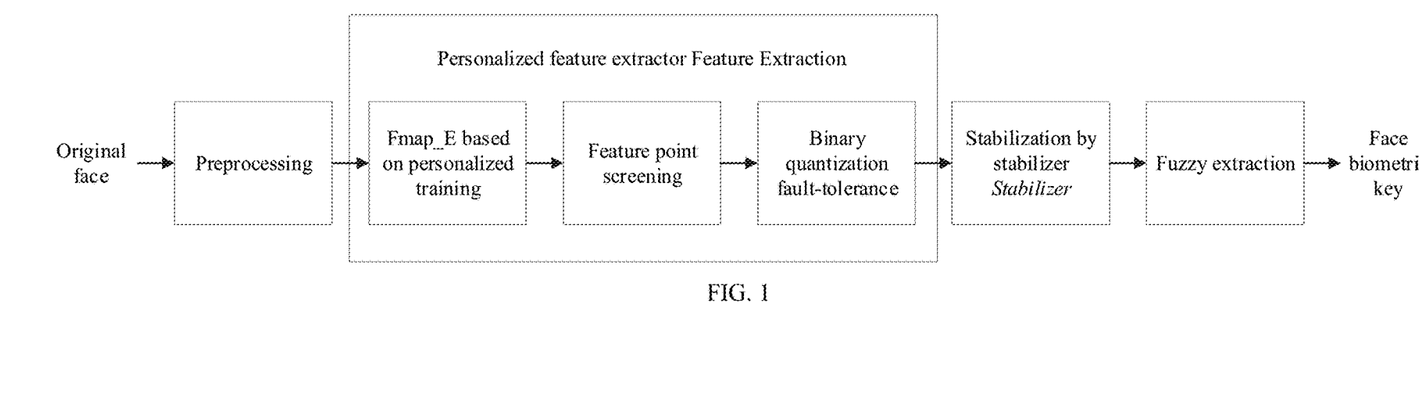
FIG. 1 is a flow chart of face biometric key generation according to the present invention.

As shown in FIG. 1, a personalized face biometric key generation method based on deep neural network coding specifically comprises the following steps.

In step 1, a pretraining data set is preprocessed. A public face data set with a large amount of data is selected as the pretraining face data set. A face in the face data set is positioned by an MTCNN method, and finally unified into a face image with a size of N1×M1, and generally, N1=M1=160. The MTCNN method is a face image preprocessing method commonly used in the art.

In step 2, a deep neural network E1 is pretrained, wherein E1 is a residual network Resnet in a convolutional neural network in this embodiment. The preprocessed pretraining face data set is used for pretraining on the Renset by the following loss function Loss, and the pretrained Resnet is capable of accurately recognizing the face in the public data set.

$$Loss = \frac{1}{N_i} \sum_i -\log \frac{e^{s(cos(\theta_{y_i}, i) - m)}}{e^{s(cos(\theta_{y_i}, i) - m)} + \sum_{j \neq y_i} e^{s(cos(\theta_{y_i}, i))}}$$

wherein, s and m are constants, s=30 and m=0.35 are selected in this embodiment, $\theta_{y_i}$ is an angle between a feature vector $x_i$ and a weight vector $W_j$ of $x_i$, $x_i$ is a result feature vector of the E1, and i is a classification category.

In step 3, a personalized feature extractor Feature_Extraction is constructed to extract a personalized feature, and the face image is converted into a feature map with a stability greater than or equal to 80%:

the stability refers to a proportion of pixels with the same pixel value in the same position to a total of pixels in all samples of the same type of images, and an image with the stability greater than or equal to 80% has a better result after learning on the stabilizer:

$$Stability(img) = \frac{num\_equal(img)}{size\_pixel(img_i)},$$

wherein stability is a stability of a set img of the same type of images, size_pixel( ) is a number of pixels in the image, and num_equal( ) is a number of pixels with the same pixel value in the same position in all samples in the image set.

Figure 2:
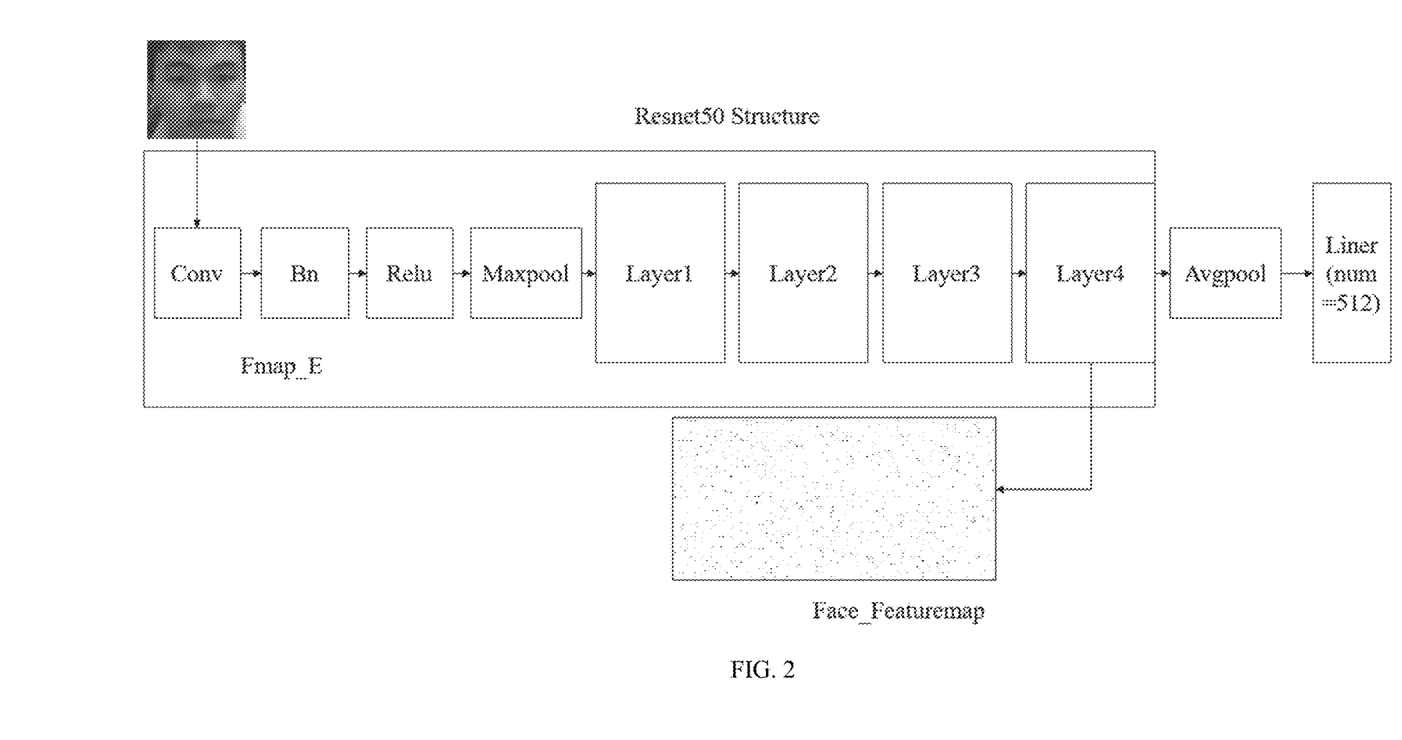
FIG. 2 is a structural diagram of a deep neural network module Fmap_E based on personalized training.

In step 3.1, a deep neural network module Fmap_E based on personalized training is constructed for transfer learning of the pretrained deep neural network E1.

A data set Faces (data in the Faces may be face images collected by a mobile phone or a camera) which actually needs to generate the face biometric key is preprocessed by the same preprocessing method as the pretraining data set, and then subjected to transfer learning on the pretrained deep neural network E1 (the Resnet in this embodiment). A transfer learning method used is a method commonly used in the art, so that the deep neural network may accurately recognize a face in the Faces, and a deep neural network E2 is obtained after learning.

The E2 in this embodiment is a Resnet network with a structure of Resnet50. As shown in FIG. 2, the deep neural network E2 after transfer learning is intercepted to form the Fmap_E (the last two layers: an average pooling layer Avgpool and a full connection layer Liner, of the Resnet50 are separated, and the remaining part is taken as the feature extractor Fmap_E), and a face feature map in the Faces is extracted by the Fmap_E. The deep neural network E2 after transfer learning may recognize the face in the Faces more effectively, so that the Fmap_E may extract the face feature map with more personalized features.

A feature map set Faces_featuremap is obtained from the Faces through the feature extractor Fmap_E:

Fmap_$E$=Resnet−Avgpool( )−Liner( )

Faces_featuremap=Fmap_$E$(Faces), wherein Fmap_E is the deep neural network module based on personalized training, Resnet is the network after transfer learning, Liner( ) is the last full connection layer of the Resnet, Avgpool( ) is the penultimate average pooling layer of the Resnet, Faces is the face data set of transfer learning, and Facs_featuremap is the face feature map set.

Figure 3:
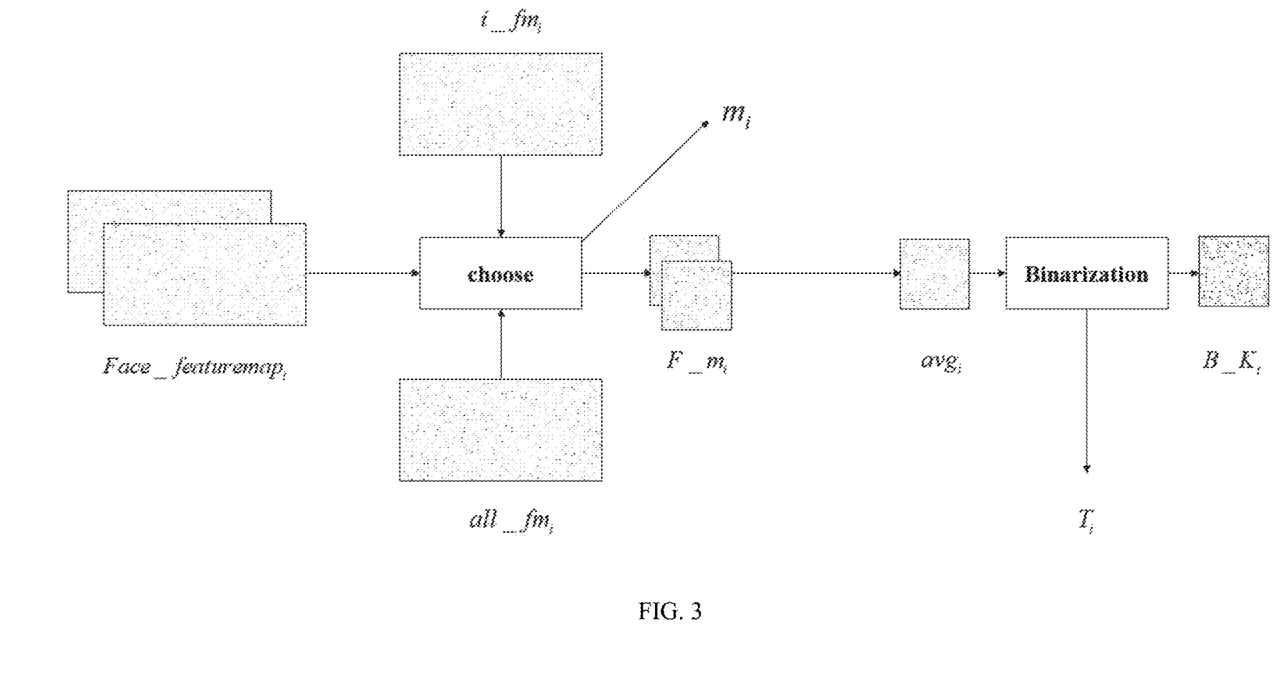
FIG. 3 is a flow chart of feature point screening.

In step 3.2, feature point screening is carried out to screen the feature map set Faces_featuremap.

As shown in FIG. 3, feature point screening is carried out on the feature map set Faces_featuremap after extracting the feature map, which comprises global screening and local screening.

In the global screening, all feature maps Faces_featuremap are used, and a global feature map all_Fm is obtained by cumulative average of each pixel:

$$all\_Fm = \frac{\sum_j \sum_i Faces\_featuremap_i}{len(Faces\_featuremap)};$$

wherein, all_Fm is the global feature map, and len( ) is a number of images in the data set.

In the local screening, a local feature map i_Fm is obtained by cumulative average of an i-type face feature map set Face_featuremap$_i$.

$$i\_Fm = \frac{\sum_j Faces\_featuremap_i}{len(Faces\_featuremap_i)};$$

wherein, i_Fm is the i-type face local feature map, and len( ) is a number of images in the data set.

Two thresholds $\theta_1$=n1 and $\theta_2$=n2 are selected, and in this embodiment, n1=2 and n2=50.

Selection of each feature map Face_featuremap$_i^j$ in the i-type face feature map set Face_featuremap$_i$ simultaneously satisfies |Face_featuremap$_i^j$–all_Fm|>$\theta_1$, a feature point of $-\theta_2 \leq$Face_featuremap–i_Fm$\leq \theta_2$ is taken as a preliminary screening point of the feature map, a feature point satisfying the selection requirement is a point m$_i$(a, b)=1 with corresponding abscissa position a and ordinate position b in a feature point selection matrix m$_i$, and a feature point not satisfying the selection requirement is a point m$_i$(a, b)=0.

A screened feature map set F_m$_i$ and the feature point selection matrix m$_i$ are obtained after feature point selection. The m$_i$ is a binary matrix with the same size as the Face_featuremap$_i$; and choose( ) is a selection process of the feature point in the Face_featuremap$_i$, feature point traversal is carried out on each image Face_featuremap$_i^j$ in Face_featuremap$_i$=[Face_featuremap$_i^1$, Face_featuremap$_i^2$,L Face_featuremap$_i^n$] when m$_i$(a, b)=1, a feature point F_m$_i^j$ (a,b) is reserved, and when m$_i$(a, b)=0, a feature point of Face_featuremap$_i^j$(a,b) is discarded.

$$m_i = \begin{pmatrix} 0 & 1 & K & 1 & 0 \\ 0 & 0 & L & 1 & 1 \\ M & M & O & M & M \\ 1 & 0 & L & 0 & 1 \\ 1 & 1 & L & 1 & 0 \end{pmatrix};$$

and

F_m$_i$=choose(Face_featuremap$_i$, m$_i$) wherein choose( ) is a feature point selection operation, F_m$_i$ is an i-type face feature point screening result, Face_featuremap$_i$ is the i-type face feature map set, and m$_i$ is the i-type face feature point selection matrix.

Figure 4:
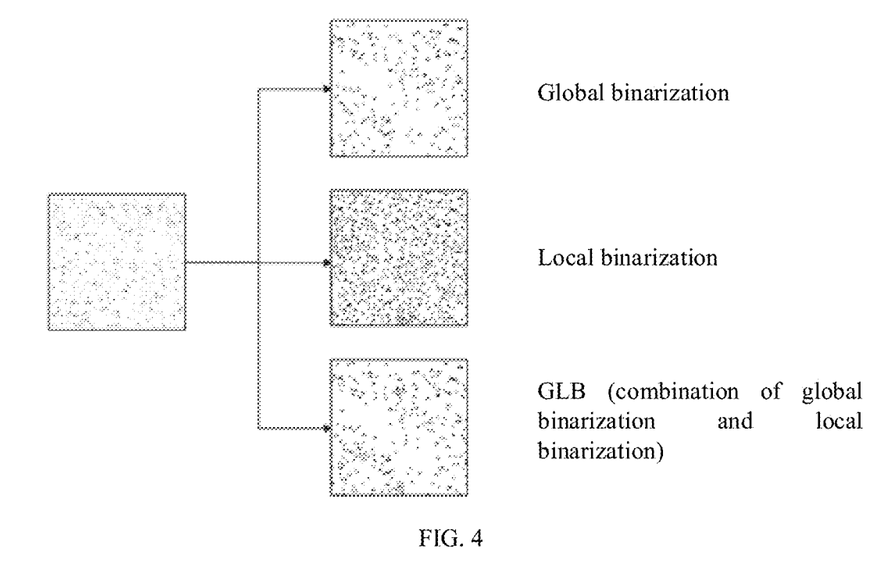
FIG. 4 is a diagram of results of different binarization methods of a feature map.

In step 3.3, binary quantization is carried out:

weighted average is carried out on the feature map set F_m$_i$=[F_m$_i^1$,F_m$_i^2$,L F_m$_i^n$] (containing multiple different face samples of the same person) to obtain an average feature map $$avg_i = \frac{\sum_j F\_m_i^j}{len(F\_m_i)}$$

first before binary quantization; wherein avg$_i$ is the average feature map of the data set F_m$_i$ of i-type face subjected to feature point screening, and len(F_m$_i$) is a number of face images in the F_m$_i$, and GLB binarization is carried out on the avg$_i$ to obtain a preliminary face biometric key B_K$_i$.

A combined method of global binarization and local binarization is used in GLB binarization, and as shown in FIG. 4, image points are sparsely distributed after global binarization, which can increase a false recognition rate of subsequent recognition, while the image points are too dense after local binarization, which can reduce a recognition accuracy. Therefore, the feature point may be better quantified by the combined method of global binarization and local binarization.

A global threshold T_all$_i$ is obtained by a global binarization OTSU method firstly, wherein the OTSU method is a method commonly used in the field of global binarization of images. The avg$_i$ is divided into blocks according to a block size of s×s (s is generally 3 or 5) secondly, an average value and a standard deviation of each block are calculated, and when the average value is less than a threshold $\theta_3$=n3 (a set value) and the standard deviation is less than a threshold $\theta_4$=n4 (a set value), the block is locally binarized. A Gaussian filter is used to process the block in local binarization, a result of the Gaussian filter is a threshold matrix of the block, which is T$_{s \times s}$=Gauss filter(avg$_{i s \times s}$), wherein Gauss filter is the Gaussian filter, and Gaussian filtering is a method commonly used in the art. When the average value is greater than or equal to the threshold $\theta_3$=n3 and the standard deviation is greater than or equal to the threshold $\theta_4$=n4, the block is binarized with the global threshold T_all$_i$, wherein the threshold matrix is T$_{s \times s}$=T_all$_i$ at this time. The avg$_i$ is traversed to obtain a binary threshold matrix T$_i$, and the feature map in the F_m$_i$ is binarized by using the T$_i$.

A to-be-stabilized biometric key b_k$_i$ after binarizing the F_m$_i$ may be obtained after binary quantization; and avg$_i$>T$_i$ is calculated according to the feature binary threshold matrix T$_i$, wherein when avg$_i$(a, b)>T$_i$(a, b), B_K$_i$=225, and when avg$_i$(a, b)$\leq$T$_i$(a, b), B_K$_i$=0; wherein a and b are an abscissa and an ordinate respectively.

$$B\_K_i = GLBinarization(avg_i, T_i);$$

$$b\_k_i = GLBinarization(F\_m_i, T_i);$$

wherein GLBinarization( ) is a binary quantization operation, and T$_i$ is the i-type face binary threshold matrix.

The deep neural network module Fmap_E based on personalized training, the feature screening matrix m$_i$ and the binary quantization matrix T$_i$ obtained in the step 3.1 to the step 3.3 constitute the personalized feature extractor Feature_Extraction.

Figure 5:
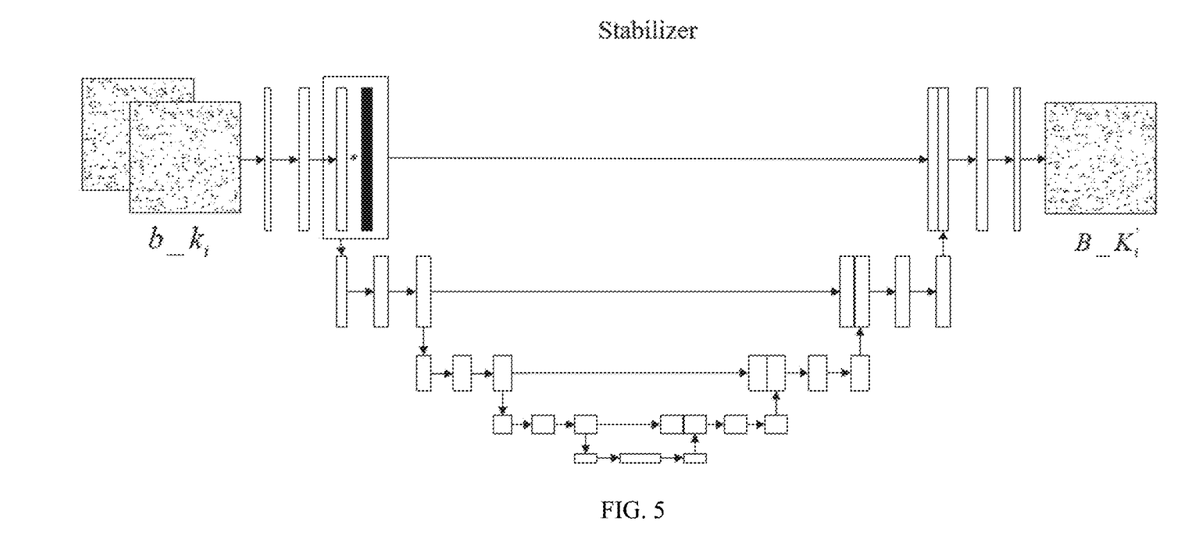
FIG. 5 is a structural diagram of a network of a stabilizer.

In step 4, stabilization from b_k$_i$ to B_K$_i$ is learned by the stabilizer, and the B_K$_i$ is a preset biometric key target value.

As shown in FIG. 5, the stabilizer Stabilizer is a deep neural network with an encoder-decoder structure, which is Unet in this embodiment, the UNet structure is different from other encoder-decoder structures in that the UNet uses down-sampled data in an up-sampling process, which is beneficial for better image restoration. However, the pure UNet cannot learn effective stabilization from b_k$_i$ to B_K$_i$, so that a learning matrix W (a black filled box in FIG. 5) is added on a top layer of the Unet, the W improves an effect of the stabilizer by learning a relationship between points, and the addition of the W greatly improves a stabilization ability of the network. The b_k$_i$ is taken as an input of the stabilizer, and the B_K$_i$ is taken as a target for learning. A combination of Binary CrossEntropy (BCE) and Sigmoid is taken as a loss function Loss=BCE(Sigmoid( ), B_K$_i$) The Binary CrossEntropy and Sigmoid function is a function commonly used in the art. The Binary CrossEntropy is calculated as a cross entropy between an output value of the stabilizer after Sigmod processing and a target value of B_K$_i$ The output value of the stabilizer after learning is recorded as B_K'$_i$=Stabilizer(b_k$_i$) the B_K'$_i$ is generally not equal to the $B\_K_i$, and there is still a certain difference between the $B\_K'_i$ and the $B\_K_i$.

Figure 6:
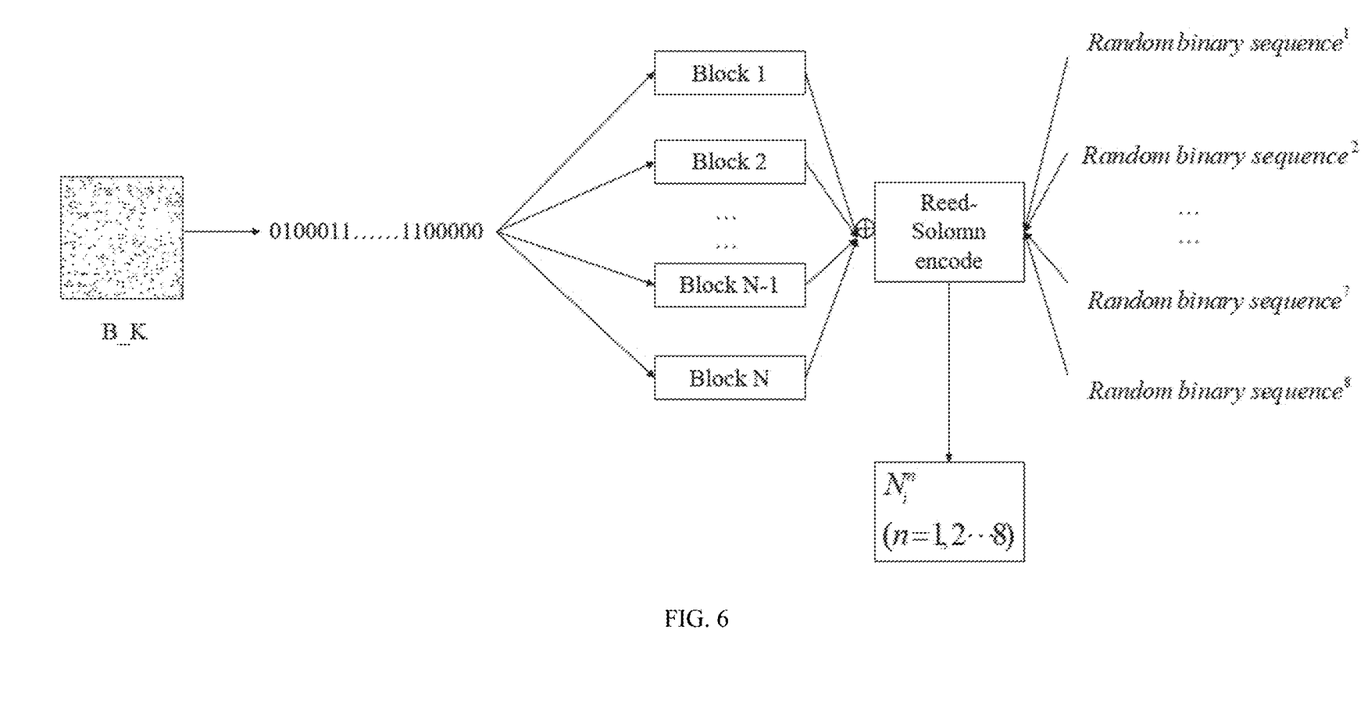
FIG. 6 shows error correction coding.

In step 5, an error correction code and fuzzy extraction are used to stabilize the $B\_K'_i$ to the $B\_K_i$.

Reed-solomon error correction is selected. As shown in FIG. 6, a block error correction method is selected, and a Reed-solomon decoding process is as follows:

the $B\_K_i$ is divided into 8 blocks by 512 bits, each block is subjected to an exclusive-or operation of a random binary sequence Random binary sequence$^n$ of 512 bits, and then each block is corrected by 64 bits for Reed-solomon encoding to obtain 8 blocks of $N_i^n$. The addition of the random binary code improves a randomness of the face biometric key.

Figure 7:
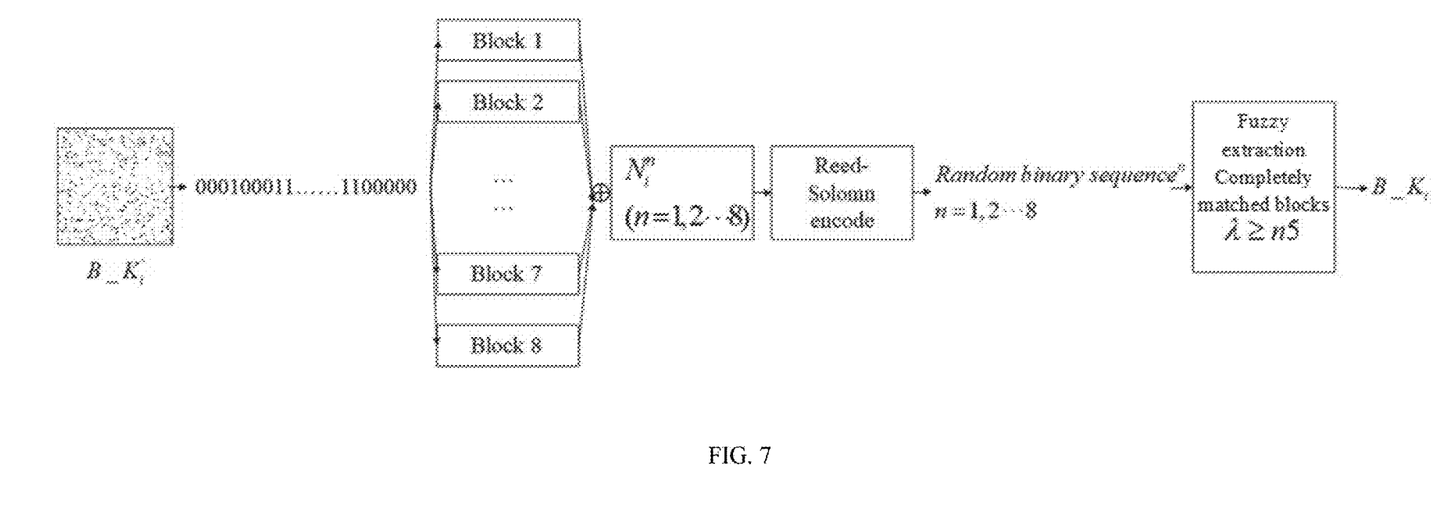
FIG. 7 shows error correction decoding and fuzzy extraction.

As shown in FIG. 7, a Reed-solomon decoding process is as follows:

block matching is also carried out in a matching process, the $B\_K'_i$ generated after the $b\_k_i$ passes through the stabilizer Stabilizer is also divided into 8 blocks, which are subjected to an exclusive-or operation with the 8 blocks of $N_i^n$ generated in encoding for Reed-solomon decoding, and Random binary sequence$^m$ is obtained after decoding.

$N_i^n$=Reed-solomon-recode($B\_K_i^n \oplus$Random binary sequence$_n$)), wherein $B\_K_i^n$ is a target biometric key, Random binary sequence$^m$ is a random binary code, and Reed-solomon-recode( ) is a Reed-solomon error correction coding operation.

$$\text{Random binary sequence}^m\text{=Reed-solomon-decode}(B\_K_i^{\prime n} \oplus N_i^n))$$

Random binary sequence$^m$ is matched with the original Random binary sequence$^n$ and then fuzzy extraction Fuzzy_extraction( ) is carried out, and the target biometric key $B\_K$ is extracted when a fuzzy extraction condition is met. The fuzzy extraction is a method commonly used in the art, and the key may be obtained by allowing some errors. A number of completely matched blocks $\lambda$ is a fuzzy extraction requirement, and when the number of matched blocks is $\Delta n5$, the fuzzy extraction requirement is considered to be met and the $B\_K_i$ is extracted, and $n5 \geq 6$ is set in this embodiment:

$$B\_K_i\text{=Fuzzy\_extraction(Random binary sequence}^m,\text{Random binary sequence}^n);$$

wherein Random binary sequence$^n$ is the original random binary sequence, Random binary sequence$^m$ is the binary sequence after Reed-solomon decoding, and Fuzzy_extraction( ) is the fuzzy extraction operation.

An extraction process of the face biometric key is as follows: an i-type new face F; belonging to the data set Faces passes through the trained personalized feature extractor Feature_Extraction in sequence to obtain a personalized feature map. Then, the personalized feature map provided by the Feature_Extraction is stabilized by the trained stabilizer Stabilizer, and finally subjected to Reed-solomon decoding and fuzzy extraction to obtain a face biometric key. The Feature_Extraction comprises providing the face feature map by the Fmap_E, carrying out the feature point selection by the feature point selection matrix $m_i$, and carrying out the binary quantization by the binarization threshold matrix $T_i$, Formal representation is as follows:

$$B\_K_i\text{=Fuzzy\_extraction(Reed-solomon(Stabilizer}(\text{Feature\_Extraction}(F_i))))$$

$$\text{Feature\_Extraction}(F_i)\text{=GLBinarization(choose}(\text{Fmap\_}E(F_i),m_i),T_i)$$

By the above method, the transfer learning method is used, the convolution network learns the face feature by pretraining a large number of face data image sets, and then the pretrained network is subjected to transfer learning on an actually needed face database, so that the convolution network may learn features of a target face more accurately. An exclusive feature of each person is selected by feature screening and binarization. Then, the face biometric key is extracted by feature extraction after screening and quantization, and stabilized by the stabilizer with the decoder-encoder structure, and finally, a biometric key meeting a target is extracted by combining the error correction code with the fuzzy extraction.

Finally, an end-to-end direct biometric key generation method is compared. There are currently three end-to-end generation methods, comprising an end-to-end biometric key generation method based on SeNet, an end-to-end biometric key generation method based on VGGNet and an end-to-end biometric key generation method based on binary fault-tolerance, and the three methods are all known in the art. In the end-to-end biometric key generation method based on SeNet, mapping between a network result feature vector and a random binary code is learned by superimposing multiple SeNet network modules and full connection layers, and the SeNet is a network commonly used in the art. In the end-to-end learning method based on VGGnet, mapping between a result feature vector and a random binary code is learned by adding several full connection layers behind the VGGnet, and the VGGnet is a network commonly used in the art. The mapping between the feature vector and the random binary code is learned in both the two methods, and in fact, results of the two methods are poor due to a randomness of the key itself and an approximate randomness of the biometric feature. In the end-to-end generation method based on binary fault-tolerance, a Sigmoid layer and a binarization layer with p as a threshold are directly added behind the feature extraction network, wherein p is generally 0.5. Experimental data of the three end-to-end methods are the same as those of the present invention, which are all the Faces. Experimental results are compared as follows:

| Method | Accuracy |
| --- | --- |
| SeNet (end-to-end) | 49.13% |
| VGGNet (end-to-end) | 50.28% |
| End-to-end generation based on binary fault-tolerance | 85.61% |
| Personalized face biometric key generation based on deep neural network coding (combination of feature extractor and stabilizer) | 99.71% |

Many feature points are provided in a process of personalized feature extraction, a bit strength of the generated face biometric key is greater than or equal to 4,096 bits, which is better than a result of the end-to-end direct face biometric key generation method in which fuzzy extraction is directly carried out on the result feature vector of the convolutional network, and an accuracy of the end-to-end biometric key generation method is less than 85%. The combination of the feature extractor and the stabilizer has an accuracy greater than 99.5% and a false recognition rate less than 0.1% in experiment. The generated biometric key is a binary sequence, without biometric information of an original face, so that a risk of privacy leakage is effectively prevented. The generated biometric key may be directly applied to a symmetric key system (such as AES) and a public key cryptosystem (such as RSA), and the combination with the key system may ensure revocability and unlinkability of the biometric key. Finally, the deep neural network and the matrix operation in a process of key extraction are both irreversible, so that the face biometric key satisfies irreversibility. The face biometric key method provided effectively improves safety and flexibility of the face feature.

The foregoing shows and describes the basic principles and main features of the present invention and the advantages of the present invention. Those skilled in the art should understand that the present invention is not limited by the above embodiments, the descriptions in the above embodiments and the specification only illustrate the principles of the present invention, the present invention may have various changes and improvements without departing from the spirit and scope of the present invention, and the changes and improvements fall within the scope sought to be protected by the present invention. The scope of protection claimed by the present invention is defined by the appended claims and their equivalents.

We claim:

1. A personalized face biometric key generation method based on deep neural network coding, specifically comprising the following steps of:

step 1: preprocessing of image:

taking a public face data set as a pretraining data set, and preprocessing an image in the face data set; and segmenting a face region from the image, and scaling the segmented face region image to the same size to obtain a face feature map;

step 2: pretraining:

pretraining the image preprocessed in the step 1 by a deep neural network, wherein the pretrained network is capable of accurately recognizing a face in the pretraining data set;

step 3: extraction of personalized feature: converting the face image into a face biometric key with a stability greater than or equal to 80% to improve a learning effect of the image on a stabilizer;

step 3.1: construction of deep neural network module Fmap_E based on personalized training:

preprocessing a personalized face image set to be trained in the step 1 and then inputting the preprocessed face image set into the pretrained deep neural network in the step 2 for transfer learning; and intercepting a part of the deep neural network after transfer learning to form the deep neural network module Fmap_E based on personalized training for extracting the personalized face feature map;

step 3.2: screening of feature map:

removing a common feature in feature maps according to all face feature maps, and selecting an exclusive feature in feature maps according to single-type face feature maps, wherein a stability of the feature map subjected to feature point screening is greater than or equal to 60%; and step 3.3: binary quantization:

obtaining a single-type face average feature map through a single-type face feature map set, binarizing the single-type face average feature map to obtain a binarization matrix, and processing the single-type face feature map set according to the binarization matrix; and regarding the binarized single-type face average feature map as the face biometric key, wherein a stability of the quantized face biometric key is greater than or equal to 80%;

step 4: learning by stabilizer:

taking a feature stabilization convolution network with an encoder-decoder structure as the stabilizer, inputting the face biometric key with the stability greater than or equal to 80% output in the step 3 into the stabilizer for stable learning, and outputting a face biometric key with a stability greater than or equal to 99%; and step 5: fuzzy extraction:

carrying out error correction with an error correction code on the biometric key output in the step 4 through an error correction coding module and then obtaining a face biometric key with a stability greater than 99.5% through fuzzy extraction by a combined method of error correction coding and fuzzy extraction.

2. The personalized face biometric key generation method based on deep neural network coding according to claim 1, wherein a residual network Resnet in the convolutional neural network is selected as the deep neural network in the step 2.

3. The personalized face biometric key generation method based on deep neural network coding according to claim 1, wherein the step 3.2 comprises global screening and local screening:

in the global screening, all feature maps Faces_featuremap are used, and a global feature map all_Fm is obtained by cumulative average of each pixel:

$$\text{all\_Fm} = \frac{\sum_j \sum_i \text{Faces\_featuremap}_i}{\text{len(Faces\_featuremap)}};$$

wherein, all_Fm is the global feature map, and len( ) is a number of images in the data set;

in the local screening, a local feature map i_Fm is obtained by cumulative average of an i-type face feature map set Face_featuremap$_i$:

$$\text{i\_Fm} = \frac{\sum_j \text{Faces\_featuremap}_i}{\text{len(Faces\_featuremap}_i)};$$

wherein, i_Fm is the i-type face local feature map, and len( ) is a number of images in the data set;

selection of each feature map Face_featuremap$_i^j$ in the i-type face feature map set Face_featuremap$_i$ simultaneously satisfies |Face_featuremap$_i^j$−all_Fm|>θ$_1$, a feature point of −θ$_2$≤ Face_featuremap$_i^j$−i_Fm≤θ$_2$ is taken as a preliminary screening point of the feature map, a feature point satisfying the selection requirement is a point m$_i$(a, b)=1 with corresponding abscissa position a and ordinate position b in a feature point selection matrix m$_i$, and a feature point not satisfying the selection requirement is a point m$_i$(a, b)=0; wherein θ$_1$ and θ$_2$ are set thresholds;

a screened feature map set F_m$_i$ and the feature point selection matrix m$_i$ are obtained after feature point selection; m$_i$ is a binary matrix with the same size as the Face_featuremap$_i$; and choose( ) is a selection process of the feature point in the Face_featuremap$_i$, feature point traversal is carried out on each image Face_featuremap$_i^j$ in Face_featuremap$_i$=[Face_featuremap$_i^1$, Face_featuremap$_i^2$,L Face_featuremap$_i^n$], when m$_i$(a, b)=1, a feature point F_m$_i^j$(a,b) is reserved, and when m$_i$(a, b)=0, a feature point Face_featuremap$_i^j$(a,b) is discarded;

$$m_i = \begin{pmatrix} 0 & 1 & K & 1 & 0 \\ 0 & 0 & L & 1 & 1 \\ M & M & O & M & M \\ 1 & 0 & L & 0 & 1 \\ 1 & 1 & L & 1 & 0 \end{pmatrix};$$

and

F_m$_i$=choose(Face_featuremap$_i$, m$_i$), wherein choose( ) is a feature point selection operation, F_m$_i$ is an i-type face feature point screening result, Face_featuremap$_i$ is the i-type face feature map set, and m$_i$ is the i-type face feature point selection matrix.

4. The personalized face biometric key generation method based on deep neural network coding according to claim 1, wherein the step 3.3 specifically comprises:

carrying out weighted average on the feature map set F_m$_i$=[F_m$_i^1$,F_m$_i^2$,L F_m$_i^n$] to obtain an average feature map $$\text{avg}_i = \frac{\sum_j F\_m_i^j}{\text{len}(F\_m_i)}$$

first before binary quantization; wherein avg$_i$ is the average feature map of the data set F_m$_i$ of i-type face subjected to feature point screening, and len(F_m$_i$) is a number of face images in the F_m$_i$, and carrying out a combined operation of global binarization and local binarization on the avg$_i$ to obtain a preliminary face biometric key B_K$_i$;

obtaining a global threshold T_all$_i$ by a global binarization OTSU method firstly, dividing the avg$_i$ into blocks according to a block size of s×s secondly, calculating an average value and a standard deviation of each block, and when the average value is less than a threshold $\theta_3$ and the standard deviation is less than a threshold $\theta_4$, locally binarizing the block; wherein a Gaussian filter is used to process the block in local binarization, a result of the Gaussian filter is a threshold matrix of the block, which is T$_{s\times s}$=Gauss filter (avg$_{is\times s}$), wherein Gauss filter is the Gaussian filter; and when the average value is greater than or equal to the threshold $\theta_3$ and the standard deviation is greater than or equal to the threshold $\theta_4$, binarizing the block with the global threshold T_all$_i$, wherein the threshold matrix is T$_{s\times s}$=T_all$_i$ at this time; and traversing the avg$_i$ to obtain a binary threshold matrix T$_i$, and binarizing the feature map in the F_m$_i$ by using the T$_i$; and obtaining a to-be-stabilized biometric key b_k$_i$ after binarizing the F_m$_i$ after binary quantization; and calculating avg$_i$>T$_i$ according to the feature binary threshold matrix T$_i$, wherein when avg$_i$(a, b)>T$_i$(a, b), B_K$_i$=225, and when avg$_i$(a, b)≤T$_i$(a, b), B_K$_i$=0; wherein a and b are an abscissa and an ordinate respectively;

B_K$_i$=GLBinarization(avg$_i$,T$_i$);

b_k$_i$=GLBinarization(F_m$_i$,T$_i$);

wherein GLBinarization( ) is a binary quantization operation, and T$_i$ is the i-type face binary threshold matrix.

5. The personalized face biometric key generation method based on deep neural network coding according to claim 1, wherein the stabilizer in the step 4 is a deep neural network Unet with an encoder-decoder structure, a learning matrix W is added on a top layer of the UNet, and the W improves an effect of the stabilizer by learning a relationship between points; and a combination of Binary CrossEntropy and Sigmoid is taken as a loss function Loss=BCE(Sigmoid( ), B_K$_i$), the to-be-stabilized biometric key b_k$_i$ is taken as an input of the stabilizer, and the preliminary face biometric key B_K$_i$ is taken as a target for learning.

6. The personalized face biometric key generation method based on deep neural network coding according to claim 1, wherein the step 5 specifically comprises:

carrying out Reed-solomon error correction, wherein a Reed-solomon encoding process is as follows:

the B_K$_i$ is divided into 8 blocks by 512 bits, each block is subjected to an exclusive-or operation of a random binary sequence Random binary sequence$^n$ of 512 bits first, and then each block is corrected by 64 bits for Reed-solomon encoding to obtain 8 blocks of N$_i^n$; and a Reed-solomon decoding process is as follows:

block matching is also carried out in a matching process, B_K'$_i$ generated after the b_k$_i$ passes through the stabilizer Stabilizer is also divided into 8 blocks, which are subjected to an exclusive-or operation with the 8 blocks of N$_i^n$ generated in encoding for Reed-solomon decoding, and Random binary sequence$^m$ is obtained after decoding;

N$_i^n$=Reed-solomon-recode(B_K$_i^n$⊕Random binary sequence$^n$)), wherein B_K$_i^n$ is a target biometric key, Random binary sequence$^m$ is a random binary code, and Reed-solomon-recode( ) is a Reed-solomon error correction coding operation;

Random binary sequence$^m$=Reed–solomon–decode (B_K$_i^n$⊕N$_i^n$)); and matching Random binary sequence$^m$ with the original Random binary sequence$^n$ and then carrying out fuzzy extraction Fuzzy extraction( ) and extracting the target biometric key B_K$_i$ when a fuzzy extraction condition is met; wherein a number of completely matched blocks λ is a fuzzy extraction requirement, and when the number of matched blocks is λ≥n5, the fuzzy extraction requirement is considered to be met and the B_K$_i$ is extracted, and n5 is a set value:

B_K$_i$=Fuzzy_extraction(Random binary sequence$^m$, Random binary sequence$^n$);

wherein Random binary sequence$^n$ is the original random binary sequence, Random binary sequence$^m$ is the binary sequence after Reed-solomon decoding, and Fuzzy_extraction( ) is the fuzzy extraction operation.

* * * * *